March 6, 1934.  H. BATCHELOR  1,949,988
NUT LOCKING DEVICE
Filed Oct. 2, 1931
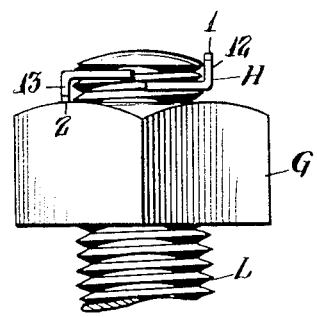
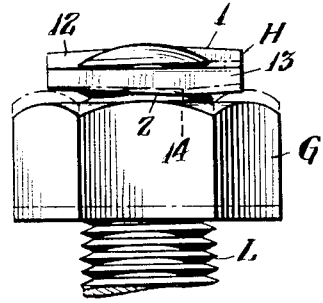
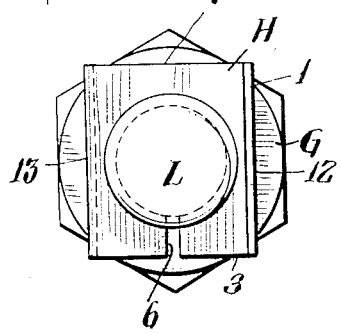
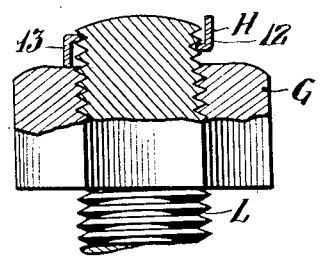
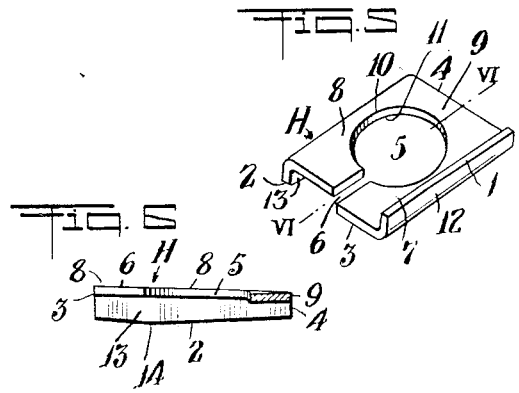
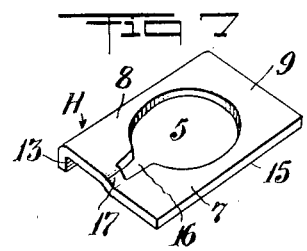
INVENTOR
*Harold Batchelor*
BY
ATTORNEY Patented Mar. 6, 1934

1,949,988

UNITED STATES PATENT OFFICE

1,949,988

NUT LOCKING DEVICE

Harold Batchelor, Jersey City, N. J.

Application October 2, 1931, Serial No. 566,425

5 Claims. (Cl. 151—21)

This invention relates to a locking device for nuts and an object of the invention is to provide a device of this character which shall be of marked simplicity and of cheapness to manufacture and which will at the same time be of a high degree of efficiency in use.

A further object is to provide a locking device which may be easily applied into locking position and as easily removed as requirements dictate.

A further and more detailed object is to provide a locking device which may be formed either of soft sheet metal or of hard tempered metal.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawing which is to be taken as a part of this specification, and in which I have shown merely a preferred form of embodiment of the invention:—

Fig. 1 is a side elevational view of a portion of a bolt having a nut thereon held in position by a locking device constructed in accordance with this invention, Fig. 2 is a similar view, but being taken at right angles to the view Fig. 1 and showing the nut and locking device in two different relative positions.

Fig. 3 is a top plan view of the structure shown in Figs. 1 and 2,

Fig. 4 is a view similar to Fig 1 but being partly in vertical central section,

Fig. 5 is a perspective view of the nut locking device,

Fig. 6 is a horizontal sectional view upon the plane of line VI—VI of Fig. 5, and Fig. 7 is a view similar to Fig. 5 but illustrating a slight modification of the locking device.

Referring to the drawing for a detailed description, the reference character L indicates an ordinary threaded bolt, and G indicates an ordinary nut threaded upon said bolt.

The locking device comprising this invention is indicated generally by the reference character H and consists of a single piece of metal, usually sheet metal. It may be either sheet iron, steel, brass, bronze, or otherwise, and it may be tempered or not, as desired. It is of a generally rectangular contour providing opposite side edges 1 and 2 and opposite end edges 3 and 4, and it has a substantially central opening 5 therethrough to receive the threaded portion of the bolt.

The material of the device is split as at 6 between the end edge 3 and the opening 5 so that the opposite halves as 7 and 8 are permitted to move with respect to each other about the portion as 9, hereinafter referred to as the hinge portion, which lies at the end opposite to the slit 6.

The device will of course be made up in different sizes to correspond with the different sizes of bolts upon which they are intended to be applied.

The size of the central opening 5 is such as to fit snugly within the relative groove portions of the threads of the bolt, and the upper and lower corners, as 10 and 11, of the opening 5 form sharp angles which bite into and form a tight frictional grip with the walls of the thread grooves of the bolt.

Each of the halves, 7 and 8, is normally flat substantially throughout their extent and hence the biting edges, 10 and 11, do not normally follow the curvature of the thread grooves of the bolt. When the device is threaded on to the bolt however, the biting edges, 10 and 11, must necessarily follow the curvature of the thread grooves helically along the bolt, and thus the halves, 7 and 8, are forced to become somewhat distorted and twisted, not only with respect to each other but also individually, and in that way produce a strong torsional strain which of course results in causing the edges, 10 and 11, to bite more forcefully and tightly against the walls of the thread grooves.

Preferably the opening 5 is made just a trifle too small for the bolt and on this account the halves 7 and 8 are obliged to swing apart a trifle about the hinged portion 9 when the device is screwed down on to the bolt, and this further raises the pressure of the edges, 10 and 11, and improved the grip thereof against the walls of the thread grooves of the bolt.

The opposite side portions of the device are flanged over in opposite directions thereby providing side flanges 12 and 13, bordering lengthwise along the halves 7 and 8 and of course materially strengthening said halves against the torsional bending and straining above referred to, and thereby still further improving the grip of the edges 10 and 11 against the walls of the thread grooves.

The flanges, being one upon each of the halves 7 and 8 respectively, each reinforces its particular half only and holds said halves each normally substantially flat so that when the device is bent, in manufacture, to spread the halves at the slit 6, as indicated in Fig. 5, for disposing the walls of opening 5 in an approximate position to follow the threads of a bolt, such bending takes place only in the hinged portion 9, being strictly localized in said portion and leaving the remainder of the halves normally flat, as already referred to.

The flanges 12 and 13 are preferably bent in opposite direction, the flange 12 extending upwardly away from the nut G and the flange 13 extending downwardly toward the nut. The edges 1 and 2 of the device thus face in opposite directions, one upwardly and the other downwardly. These two flanges, and their edges, are shaped identical with each other except that they are reverse with respect to each other, and hence the entire device is reversible so that it may be introduced onto a bolt with either side of itself facing the nut.

The relationship of the various parts of the device is such that the only portion thereof which comes ever into engagement with the surface of the nut is the lower edge of the flange 12 or 13 which faces downwardly toward the nut, in the present instance, being the edge 2 of the flange 13.

The edge 2 of flange 13 is formed so that it provides a relatively low point as 14 at a location which is slightly removed from the middle of the length of said edge and nearer to the end 3 than to the end 4 of the device. At opposite sides of the low point 14 the edge 2 inclines upwardly a slight degree.

Thus, when the device is screwed down along the bolt and into engagement with the nut for holding the nut against unscrewing, the low point 14 first comes into engagement with the nut, and thereafter a slight further downward screwing of the device along the bolt results in a distortion of the half 8 dependent in amount upon the degree to which the further screwing down of the device against the nut is carried. This distortion is due to the fact that, as graphically illustrated by the dotted line illustration of parts in Fig. 2, the pressure against the low point 14 causes the adjacent end of the flange 13 to be forced relatively upwardly so that said flange, as seen in Fig. 2, by dotted lines, becomes relatively inclined out of its normal position. This movement of the flange is of course not accompanied by a corresponding movement of the edge walls of the opening 5, and hence it produces an extremely powerful frictional grip of the edges 10 and 11 of the opening 5 against the walls of the thread grooves of the bolt amounting in effect to a positive locking of said edges 10 and 11 frictionally with the walls of the thread groove.

Also the pressure of the flange 13 against the nut and the consequent relative upward movement of the half 8 of the device without a corresponding movement of the half 7 of the device produces a further distortion of the device particularly at and adjacent to the hinge portion 9 causing the edges 10 and 11 in this vicinity to become, or tend to become, distorted, thereby providing additional grip of the device upon the bolt.

It will be obvious of course that the powerful strains and pressures above referred to holding the edges 10 and 11 against the walls of the thread grooves throughout the half 8 of the device are resisted by the walls 10 and 11 throughout the half 7 of the device and that hence the walls or edges 10 and 11 throughout the half 7 are also held in powerful frictional contact with the walls of the thread grooves, and it will thus be seen that in use when the device constituting this invention is screwed down with a fair degree of tightness against a nut on a bolt, or when the nut moves upwardly against the device, as indicated by dotted lines in Fig. 2, the device becomes effectually locked against possibility of displacement except by intentionally applied force.

The rectangular contour of the device lends readily to the use of a wrench of simple form wherewith to screw it on to or off of a bolt. Such a wrench may engage either the oppositely facing edge surfaces 3—4, or the oppositely facing side surfaces of the flanges 12—13.

A device constructed as herein disclosed is extremely simple and may be made up of various different kinds of material, either hard or soft sheet metals serving with almost equal efficiency in most cases. It may be very cheaply and economically manufactured. It may be very easily applied by unskilled hands, and it is of high efficiency in the accomplishment of the purposes for which it is used. It also may be used repeatedly, that is to say, it may be unscrewed and removed from operative position upon one bolt and then screwed into operative position upon another bolt, and it will be of substantially the same efficiency throughout these repeated uses. It may be noted in this connection that due to the fact that only one of the halves 7—8 is subjected to violent distortional strains when the device is in use, the second half being but slightly disturbed, the device may be, if desired, used a second time by applying it in a reversed position so as thereby to dispose the relatively uneffected half at this time for engagement against the nut.

The structure illustrated in Fig. 7 of the drawing is the same as has already been described except that in this instance two modifications are proposed as compared with the device as thus far described: First, that the device may be formed with only one of the side flanges 12—13, the other being omitted and leaving an unflanged edge as 15, thereby economizing in the amount of material required for a given size of the device, and, Second, that instead of slitting entirely through the material to form the slit 6 heretofore described, the material may be formed only with a notch as 16 leaving a tie as 17 integral with the halves 7 and 8 for tieing said halves together and for reinforcing said halves with respect to each other at their relatively separated ends opposite to the hinge portion 9. The notch 16 enables the halves 7 and 8 to be inclined one up and the other down in the same manner as does the slit 6 so that the walls of the opening 5 may approximate normally the helical curvature of the bolt threads. The tie 17 inclines downwardly from the half 8 to the half 7 and is thereby possessed of a sufficient resilience to enable said halves to move slightly with respect to each other when strains are applied thereto in use as will be apparent from the above description. At the same time this tie will of course resist movement of the halves with respect to each other and thus improve the frictional grip of the walls or edges of opening 5 against the walls of the thread grooves.

As many changes could be made in this construction without departing from the scope of the invention, as defined in the following claims, it is intended that all matter contained in the above description, or shown in the accompanying drawing, shall be interpreted as illustrative only and not in a limiting sense.

Having thus described my invention what I claim is:

1. A locking device for nuts, comprising a piece of sheet metal having an opening therethrough the wall of which is disposed to follow the thread groove of a bolt upon which the device is intended to be screwed, said piece of sheet metal having a laterally turned flange at one edge thereof the edge of which flange is disposed to engage against a nut on said bolt when the device has been screwed along the bolt into nut locking position, and said edge of the flange being shaped to provide a relatively projecting point for first engaging the nut, said edge receding from said point at opposite sides thereof lengthwise of said edge.

2. A locking device for nuts, comprising a piece of sheet metal having an opening therethrough the wall of which is disposed to follow the thread groove of a bolt upon which the device is intended to be screwed, said piece of sheet metal having a laterally turned flange at one edge thereof the edge of which flange is disposed to engage against a nut on said bolt when the device has been screwed along the bolt into nut locking position, and said edge of the flange being shaped to provide a projecting point for first engaging the nut, which point is relatively nearer to one end of said edge than to the other.

3. A locking device for nuts, comprising a piece of sheet material having an opening therethrough and being slit from said opening outwardly through the margin of said piece at one point so that opposite halves of the device are movable with respect to each other, said opposite halves being disposed so that the wall of said opening may follow the thread groove of the bolt upon which the device may be screwed, one of said halves having a laterally turned flange thereon the edge of which flange is disposed to engage against a nut on said bolt when the device has been screwed along the bolt into locking position, and said edge of the flange being shaped to provide a projecting point for first engaging the nut, said projecting point being spaced from both ends of said edge but being relatively nearer to one end of the device than to the other.

4. A locking device for nuts, comprising a piece of sheet material having an opening therethrough and being slit from said opening outwardly through the margin of said piece at one point so that opposite halves of the device are movable with respect to each other, said opposite halves being disposed so that the wall of said opening may follow the thread groove of the bolt upon which the device may be screwed, one of said halves having a laterally turned flange thereon extending lengthwise of said half, and the edge of which flange is disposed to engage against a nut on said bolt when the device has been screwed along the bolt into nut locking position, said edge of the flange being shaped to provide a projecting point for first engaging the nut, said point being relatively nearer to one end of said half than to the other.

5. A locking device for nuts, comprising a piece of sheet material having an opening therethrough and being slit from said opening outwardly through the margin of said piece at one point so that opposite halves of the device are movable with respect to each other, said opposite halves being bent so that the wall of said opening may follow the spiral contour of the thread groove of the bolt upon which the device may be screwed, one of said halves having a laterally turned flange formed thereon extending longitudinally in a straight line lengthwise of said half in a plane substantially parallel with a straight line extending through said slit radially of said opening, the longitudinal free edge of said flange being disposed to engage against a nut on said bolt when the device has been screwed along the bolt into locking position, the other of said halves being shaped to have no engagement with the nut, and both halves of the device being distortable and adapted to be distorted in a manner to force the walls of said opening into tight frictional engagement with the walls of the thread groove of the bolt by forced engagement of the edge of said flange against the nut.

HAROLD BATCHELOR.